US011882510B2

(12) United States Patent
Barron

(10) Patent No.: US 11,882,510 B2
(45) Date of Patent: Jan. 23, 2024

(54) VEHICLE AND SYSTEM FOR CONFLICT DE-ESCALATION

(71) Applicant: Public Transportation Safety Int'l Corp., Los Angeles, CA (US)

(72) Inventor: Mark B. Barron, Bel Air, CA (US)

(73) Assignee: Public Transportation Safety Int'l Corp., Los Angeles, CA (US)

( * ) Notice: Subject to any disclaimer, the term of this patent is extended or adjusted under 35 U.S.C. 154(b) by 250 days.

(21) Appl. No.: 17/389,494

(22) Filed: Jul. 30, 2021

(65) Prior Publication Data

US 2022/0038865 A1 Feb. 3, 2022

Related U.S. Application Data

(60) Provisional application No. 63/183,703, filed on May 4, 2021, provisional application No. 63/059,423, filed on Jul. 31, 2020.

(51) Int. Cl.
  *H04W 4/90* (2018.01)
  *B60P 3/32* (2006.01)
  *H04N 7/18* (2006.01)

(52) U.S. Cl.
  CPC .................. *H04W 4/90* (2018.02); *B60P 3/32* (2013.01); *H04N 7/18* (2013.01)

(58) Field of Classification Search
  CPC ....... A61G 3/001; B60P 3/32; B62D 33/0612; H04W 4/90
  USPC ........................................... 296/24.38, 24.42
  See application file for complete search history.

(56) References Cited

U.S. PATENT DOCUMENTS

| 5,755,478 | A | 5/1998 | Kamiya et al. |
| 9,081,382 | B2 | 7/2015 | Doyle et al. |
| 9,841,865 | B2 | 12/2017 | Guzik |
| 9,922,515 | B2 | 3/2018 | Hoy |
| 10,049,419 | B1 | 8/2018 | Marron et al. |
| 10,086,742 | B2 | 10/2018 | Piehl et al. |
| 10,269,242 | B2 | 4/2019 | Ahmad et al. |
| 10,368,806 | B2 | 8/2019 | Kim |
| 10,492,970 | B2 | 12/2019 | Merino et al. |
| 10,992,755 | B1* | 4/2021 | Tran ...................... G01S 13/931 |
| 2003/0164601 | A1 | 9/2003 | Hamlett |
| 2016/0158077 | A1* | 6/2016 | Bourgraf .............. A61G 3/0816 296/24.38 |
| 2017/0064527 | A1* | 3/2017 | Bohlander .............. H04W 4/02 |
| 2018/0018869 | A1* | 1/2018 | Ahmad .................. G06V 20/63 |
| 2019/0196514 | A1 | 6/2019 | Kanehara et al. |
| 2020/0294385 | A1* | 9/2020 | Lowe ................... G08B 25/005 |

\* cited by examiner

*Primary Examiner* — Jason S Daniels
(74) *Attorney, Agent, or Firm* — Diederiks & Whitelaw, PLC.

(57) ABSTRACT

A specialized vehicle is provided to assist conflict resolution personnel in controlling unique incidents involving a mentally challenged, drug controlled, handicapped or other incapacitated, irrational or unpredictable individual. The vehicle is specially designed and equipped to provide a controlled environment where the individual can be directly dealt with in a calming and soothing manner, while also monitoring a control perimeter about the vehicle and communicating with people outside the vehicle about a particular incident, thereby assisting in de-escalating a potentially volatile situation. In association with de-escalating, one or more computer and/or cellphone app portals are established to provide people with incident related information.

19 Claims, 2 Drawing Sheets

VEHICLE AND SYSTEM FOR CONFLICT DE-ESCALATION

CROSS-REFERENCE TO RELATED APPLICATIONS

The present application claims the benefit of U.S. Provisional Patent Application Ser. No. 63/059,423 entitled "Vehicle De-escalation Unit" filed Jul. 31, 2020 and U.S. Provisional Patent Application Ser. No. 63/183,703 entitled "Vehicle and System for Conflict De-escalation" filed May 4, 2021, both of which are hereby incorporated by reference in their entirety.

BACKGROUND OF THE INVENTION

Field of the Invention

The present invention is directed to a system and vehicle designed for use in assisting law enforcement and/or conflict resolution personnel with appropriately addressing certain situations involving select individuals who may not be in complete control of their actions but still need to be properly subdued including, without limitation, incapacitated individuals. In particular, the invention is directed to employing a legally authorized detainment vehicle equipped to specifically aid law enforcement and/or conflict specialists dealing with such select individuals in a humane manner, as well as monitoring and communicating to people in the vicinity of the vehicle, in order to de-escalate potentially dangerous situations, while establishing a physical barrier between a detainee and both the law enforcement personnel and the public.

Description of the Related Art

Law enforcement personnel are often faced with individuals who are unruly and/or despondent, such as individuals who are under the influence of drugs, mentally disabled or otherwise simply not in full control of their faculties and actions. Unfortunately, perhaps due to lack of adequate training or inability to address the matter in an optimal manner due to existing circumstances, law enforcement officers and conflict resolution personnel might find it necessary to use a significant degree of force in controlling such an individual. However, it must be realized that such personnel have no real avenue in which to turn for assistance but rather are tasked to handle even these types of difficult situations themselves, sometimes resulting in unfortunate results. Simply put, this invention is directed to providing a system and particularly designed vehicle enabling a more appropriate approach to dealing with in these situations.

SUMMARY OF THE INVENTION

The present invention is directed to providing a system enabling law enforcement personnel to call for a specialized vehicle and conflict resolution personnel to assist in controlling unique situations involving a mentally challenged, drug controlled, handicapped or other incapacitated individual, basically individuals that are not or just may not act in a rational or predictable manner. The vehicle is specially designed and equipped to provide a controlled environment where the individual can be directly dealt with in a calming and soothing manner, while also monitoring a control perimeter about the vehicle, thereby assisting in de-escalating a potentially volatile situation. The overall system includes maintaining a database of personnel training/background information and enabling the transmission, to either or both of the law enforcement and conflict resolution personnel, of relevant information concerning situational specifics, parties involved and response details.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF INVENTION

Figure 1:
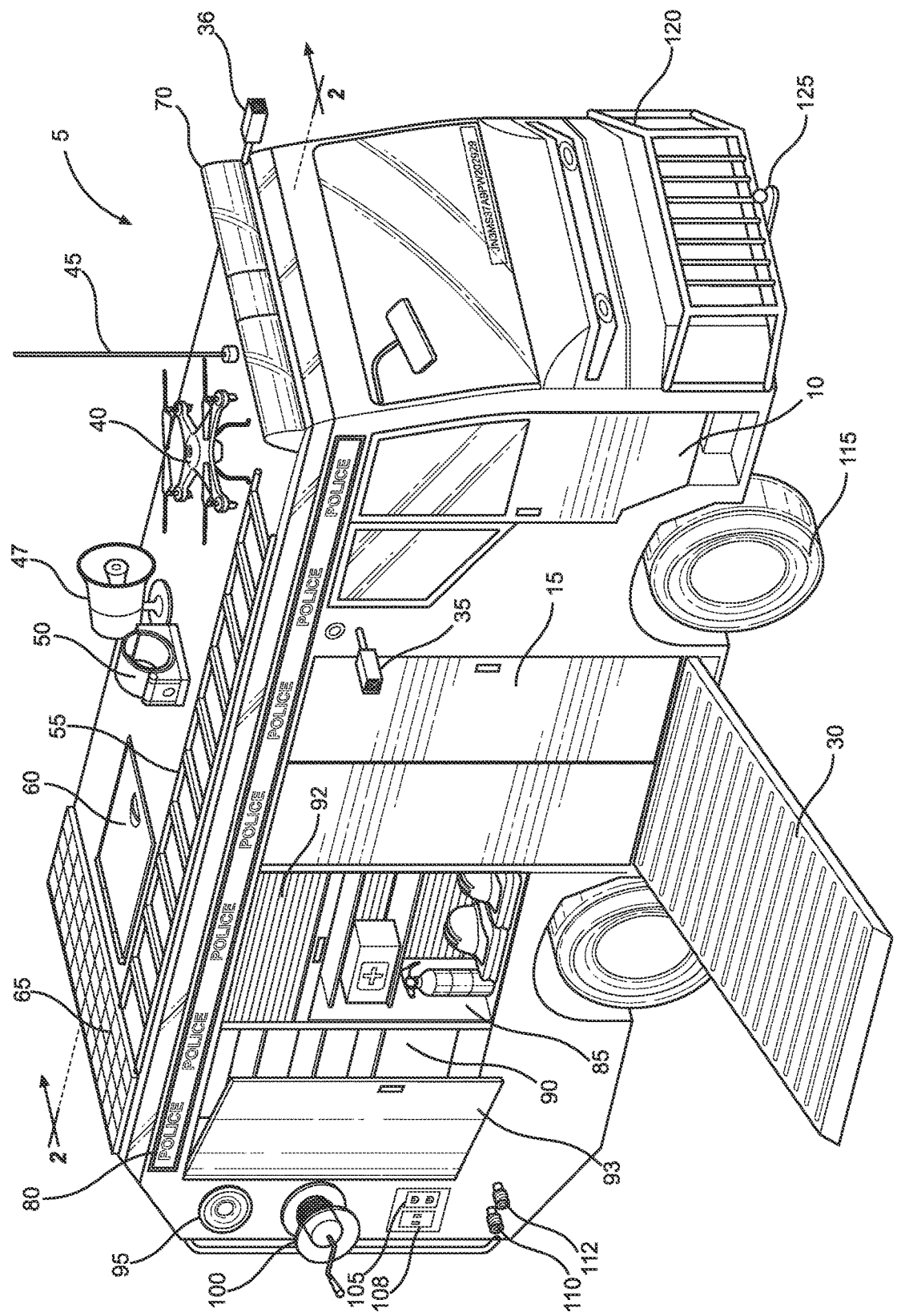
FIG. 1 is perspective view of an exemplary de-escalation vehicle constructed in accordance with the present invention.

For purposes of this description, reference will be made to the figures in describing numerous preferred features which can be employed in part, or in any combination, in establishing a system and vehicle which can be used to assist appropriate personnel in controlling unique situations involving a mentally challenged, drug controlled, handicapped or other incapacitated individual, basically individuals that are not or just may not act in a rational or predictable manner, in accordance with the invention. Certainly, it should be understood that aspects of the invention could be realized in various forms. For example, in connection with the vehicle aspect of the invention, it should be recognized that the vehicle employed could range from a self-driving unit to a trailer or any other type of modular structure which can be deployed to aid local, county, state or even federal personnel in various potentially tenuous situations involving one or more individuals requiring unique care in connection with security, investigation or other actionable matters. The vehicle is intended to establish a safe, calming environment in which to house an individual who, for one reason or another, cannot be otherwise retained and questioned without the use of significant force. Although the vehicle is mainly intended to be deployed as needed for police, conflict specialists and other enforcement agencies, the vehicle can also be made available to other public services such as fire, medical aid and other public assistance agencies, as well as even private medical and security services. Although the vehicle could be attended by enforcement personnel and conflict specialists, attending staff may also include medical and/or psychiatric personnel.

As will become more fully evident below, the vehicle is not only designed to protect and comfort an individual of concern but is equipped to selectively interact and monitor any surrounding crowd or area. The interaction can take the form of pre-programmed messages or announcements aimed at drawing attention to the arrival and purpose of the vehicle for both the subject individual and any gathering of people. Spontaneous audible and/or visual messages can also be presented as deemed necessary in a given situation, such as the potential need to try to de-escalate interactions between parties at the scene, control any rising violence and simply attempt to reduce tensions. In connection with the monitoring, both visual and audible recordings are made from units incorporated into the vehicle, while a drone may also be deployed from the vehicle for this purpose.

The overall system ties into the vehicle and presents various additional aspects. In connection with de-escalating an overall situation, surveillance information obtained using the vehicle can potentially be broadcast via the Internet, television, radio, a cellphone app or the like particularly to inform other people in that neighborhood or surrounding region for public awareness purposes, basically informing people of an event and the manner in which it was being handled. Such surveillance data provides comprehensive transparency in conveying the circumstances surrounding the intervention and assistance provided.

Select Exterior Vehicle Features

As shown in the accompanying figures, a vehicle constructed in accordance with an exemplary embodiment of the invention is generally indicated at 5. Preferably, vehicle 5 has, in addition to driver (not shown) and passenger doors 10, at least one side door 15 and a rear door 20 to provide multiple entrance and exit points to a compartmentalized rear interior cabin region 25. Doors 15 and 20 are preferably transparent to provide a clear view into vehicle 5 from those outside but can only be open in a regulated manner by authorized personnel. In a particularly preferred embodiment, handprint, face or other recognition information, perhaps in combination with a pre-programmed verbal que, can be used to open a select door without the need to actually grasp the door, thereby freeing the hands of vehicle personnel for other actions (hands-free opening). Either before or upon entering either of doors 15 and 20, each person is subject to various security detection, including a visual detection of an individual (e.g., face recognition) which can be compared to available databases, and other body scanning-type detectors such as explosive, flammable materials, x-ray and the like. At side door 15, there is shown to be a ramp 30 to enhance access by handicapped individuals or to simply avoid the need to traverse raised steps into vehicle 5. At this point, although door 15 is shown to be a bi-fold door, various access arrangements could be employed.

As shown, vehicle 5 incorporates various cameras, such as indicated at 35 and 36, potentially with FLIR infrared vision. Overall, it is the intent to provide enough cameras on vehicle 5 to record happenings in the entire area immediately surrounding vehicle 5, with a drone 40 for selective deployment to enhance this information gathering. Again, it should be recognized that vehicle 5 is intended to be dispatched in tenuous situations such that this additional gathering ability will enhance record keeping, situation awareness and analysis, and provide additional neighborhood awareness.

Also shown atop vehicle 5 is an antennae 45 for dispatching and other communication needs, a speaker 47 for public address or awareness purposes, a spotlight 50 which can be used in combination with various LED work lights (not separately shown) provided around vehicle 5 to illuminate the area surrounding vehicle 5 for nighttime use, a ladder 55 for access purposes, a rear compartment access hatch 60, a series of solar panels 65 as a clean energy source for battery charging purposes, and a front emergency light unit 70, which can also incorporate a siren (not shown).

On a side 75 of vehicle including door 15 there is also provided an LED message bar 80 for displaying a scrolling or fixed message including a web address, TV or radio channel listing to provide additional information regarding the event, various compartments 85 and 90 for storing gear and supplies employing powered rollup 92 or swing-out doors 93, a speaker 95, a deployable caution tape unit 100 (note laser perimeter establishing system could be employed), exterior electrical plugs 105, a hot water control unit 108 which can be used with a water from a tank (not shown) for selective dispensing either inside vehicle 5 or through an exterior line indicated at 110, and a power cord attachment 112. If deemed appropriate, all exterior body portions, including the exterior glass and undercarriage of vehicle 5, can be made from weapon resistant material so as to be bullet-proof and fire-resistant, while run-flat tires 115 can be employed. Also shown in FIG. 1 is a front push bar 120 and hitch 125, with similar structure being available at the rear of vehicle 5.

Certainly, a host of other equipment and features can be accommodated (not necessarily shown), such as: exterior accessed paramedic equipment; a roll-out gurney; exterior phone charger; fire extinguisher; hose for pumping water, foam or the like; power cable winches; other lifesaving equipment including breathing apparatuses; exterior mounting points for devices such as hand, wrist, body or ankle cuffs; roof rings or other mounts for crane hoisting of vehicle; atmospheric monitoring equipment for air quality testing (e.g., gas or hazardous material detection); vehicle identification decals or the like; an exterior mounted extraction basket; etc. In addition, the vehicle 5 can be specifically designed to dock directly with a separate transfer unit or even a building. Exterior coloring preferably employs beige greens and pale yellow-greens, as they are the most stress-reducing shades.

Select Interior Vehicle Features

Figure 2:
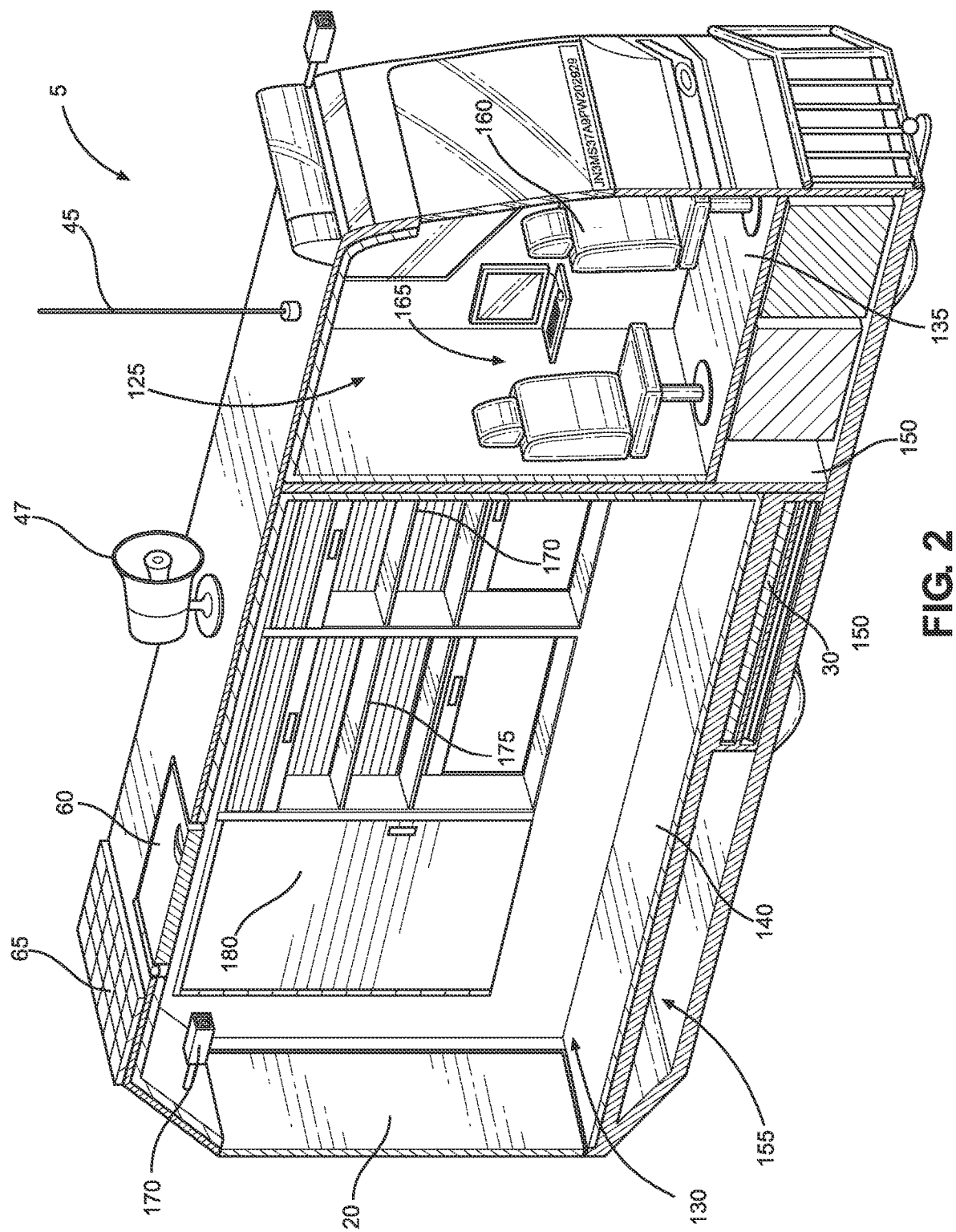
FIG. 2 is a cross-section of the vehicle of FIG. 1, showing additional interior features of the vehicle.

As with the exterior, the interior of vehicle 5 can take various forms and be designed with a wide range of select optional features. As exemplified best in FIG. 2, vehicle 5 includes a driver and control compartment 125 separated from a rear compartment 130. Below the floors 135 and 140 of compartments 125 and 130 are storage areas 150 and 155. Behind a driver's chair 160 is a communication station 165 including a chair, desk and computer set-up. Various shelving 170 and 175, as well as other enclosed storage zones such as at 180, are provided in rear compartment 130. Monitoring in rear compartment 130 is done through visual and audible means, such as multi-way communication camera/speaker unit 170. Although a single, generally open rear compartment 130 is shown, it should be noted that the rear of vehicle 5 could be compartmentalized (e.g., employ a cube floor plan) in order to separately hold more than one individual.

Although not individually shown for simplicity of the cut-away figure, it is preferably desired to at least provide rear compartment 130 with, in addition to standard features like separate heating and ventilation: interior safety padding; safety handrails; a built-in bed (murphy bed); seating, preferably hard contoured seating rather than cloth or leather; a toilet; a sink (particular in case a housed individual needs to vomit); water dispenser; equipment for both inside and outside-to-inside communication (preferably with auto translation ability) and for contacting the individual's family, significant other(s) or agents; safety restraints as needed to restrict individual's movements, such as while transporting; cleaning ports for introducing disinfectant aerosols, steam, sanitizers and the like between occupants, i.e., a system to spray down interior; floor drains for any cleansing fluids; medical equipment; nourishment items to eat and drink; testing equipment such as a breathalyzer or even infection detection; sedative delivery unit; video monitor to display calming or instructional information; and/or perhaps required law enforcement equipment for obtaining ID, fingerprints, photo for recognition purposes, retina and voice scanners, and the like. In all, the unit is designed with the safety and needs of the individual in mind. Interior coloring can also employ beige greens and pale yellow-greens, as they are the most stress-reducing shades.

Select Operator Additions/Features

Typically, the operators would be wearing safe, protective, non-threatening uniforms supporting some basic accessories such as a flashlight, mobile communication/computer device, and the like. Certainly, the operators or crew of vehicle 5 will also need special equipment such as: available biohazard suits with filtered air breathing systems; professional, non-threatening uniforms, preferably with reflective zones and clear identification indicia; gloves; masks; other personnel safety equipment and training; and perhaps data glasses with a camera, such as GOOGLE glasses-type augmented reality headset. Certain non-lethal weapons can also be provided, such as tasers, chemical eye and breathing irritants like mace and pepper spray, restraint netting such as sold by NetGun at NetGun.com, or restraining wrap arrangements such as sold by Wrap Technologies at wrap.com. The operators can be contacted and dispatched in the same way as currently used for police, fire, ambulance and the like personnel. Vehicle 5 can be housed at an established public, private or government location depending on the town/city/county etc. of use, or can even be taken home by individual operators for faster response times. Most preferably, vehicle 5 is an electric vehicle which is fully charged between uses so as to be ready for deployment.

Select System Features

As indicated above, the vehicle preferably includes interior and exterior audio/video cameras for recording details about a given incident and enabling bi-direction communication between inside and outside the vehicle. All of this information can be transmitted to a database for evaluation by law enforcement, mental health or other crisis management professionals and the like, particularly for establishing training and future response protocols. In addition, in accordance with another aspect of the invention, the public can be provided access to some or all of the data through an established portal, such as through an internet website, a mobile app. or even televised broadcasting. The portal can also list employment opportunities, even provide for the ability of people to send resumes, and aid in a person to find mental help. Furthermore, the system is designed to enable the ability to enter suggestions, identify area hot spots where the vehicle may most be needed, and public contact information, all of which can better aid appropriate personnel in connection with training, dispatching and/or other purposes.

A separate portal (again direct internet site or mobile app based) is made available to law enforcement and system associated conflict resolution personnel to access information specifically relevant to them. For instance, this information could include the listing of upcoming conventions, workshops, training events, and the like. Certainly, it is important for all involved to be properly trained, with the crisis intervention team needing to be vetted, trained and certified with current de-escalation skills, while law enforcement officers need to be particularly trained on recognizing criteria for requesting a de-escalation unit and approaches to divert issues arising until the intervention team arrives. In addition, this portal would have access to certain confidential incident registry log information, both past cases and any current case. Also, the database associated with this portal will have information on the background and qualifications of law enforcement and conflict resolution personnel including facial image, name, training, relevant field specialties, languages spoken and contact information, which can be shared before arriving at a particular scene. With this information, on-site and vehicle arriving personnel for a given incident can save valuable time by becoming somewhat familiar with each other in advance. If this information is not available or otherwise provided, a crisis intervention management QR code or the like can be found on the uniform of each of the members of the crisis de-escalation vehicle which can be scanned to also convey this information, particularly as needed for the overall record. In addition, other information can be relayed, such as estimated time of arrival, location data, desired parking position, current situation details like suspect's name and established health issues, current plan of action, images from the location, potentially live streaming video, and other available information. To this end, GPS is preferably used to provide tracking information on vehicle 5, including location and estimated time of arrival, and resource information such as the locations of the incident site, nearby medical facilities and close law enforcement, fire and paramedic support locations. Basically, the app could connect arriving and scene present personnel for advance communication, potentially through GPS, audio, telepresence, text, email and other forms of information sharing.

The vehicle operators or conflict specialists can be salaried, or paid by miles, time, per case, or in other contract fashions. Certainly, multiple specialists or assistants can be assigned to a specified unit, with each being either dependent or independent of law enforcement. For instance, these individuals could be part of a private company, part of a city public health agency, from a specialized law enforcement group or a combination thereof. Regardless, they are vetted and trained to have the requisite qualifications. The individuals can be selected and dispatched based on the particular incident needs versus expertise, solely on closet available, per special request, or a host of other factors. Preferably, the private portal would have access to a searchable database on all the specialists, assistants and even interacting law enforcement personnel (new, current and past), as well as past incident data, for informational purposes. At the very least, this information could create a favorable familiarity (basically a closed social network) between the various personnel.

Overall, in certain circumstances, law enforcement personnel and conflict specialists may be faced with a situation involving unruly, imbalanced or otherwise handicapped individuals which needs to be calmed before any meaningful progress can be made to determine all the relevant issues that need to be identified and addressed. Even with superior training of law enforcement personnel and conflict resolution specialists, human resources may be inadequate to de-escalate the initial encounter. The vehicle provides a mechanism for creating a physical barrier between the individual being assisted and the law enforcement personnel and conflict specialists. Once deployed, law enforcement personnel and conflict specialists have tools to safely and effectively interview the individual being assisted and provide medical and/or mental health assistance. De-escalation takes place in an isolated, controlled, protected and observation friendly, calming environment to the point where either the individual can rationally assist law enforcement and/or conflict specialists in addressing the situation or the individual can be taken to an appropriate facility for further help. Here, the invention has the potential to prevent individuals from experiencing inappropriate and needlessly harmful interactions where tensions have escalated. The de-escalation unit, when implemented by law enforcement, conflict specialists and other personnel, will further the goals of law enforcement, but with public safety and the safety of the individual being assisted as the paramount objectives.

It is desired that the existence of such a vehicle and system will become welcomed by community members, passers-by and others gathered in the area and considered an appropriate avenue to assist in humanely handling situations involving mentally challenged, drug controlled, handicapped or other, even partially incapacitated individuals. Basically, the vehicle, system, and their available features would provide law enforcement personnel and/or conflict specialists with an appropriate alternative in dealing with certain difficult situations and the public at large will learn to appreciate the efforts being made in attempting to approach these situations in a more humane and effective manner.

Although described with respect to preferred embodiments of the invention, it should be understood that various changes and/or modifications can be made without departing from the spirit of the invention. In general, the invention is only intended to be limited by the scope of the following claims.

The invention claimed is:

1. A method of operating a conflict de-escalation system employing a vehicle having at least one door leading to an interior cabin region comprising:
   deploying the vehicle to a scene in dealing with an incident involving a mentally challenged, drug controlled, handicapped, incapacitated and/or unpredictable individual;
   directing the individual into the interior cabin region;
   monitoring an environment of the scene to develop incident related information; and
   interacting with people by providing the incident related information to others outside the vehicle through the conflict de-escalation system, wherein interacting with people includes providing public awareness broadcasts originating from within the vehicle, with the public awareness broadcasts including one or more of internet, television, radio and cell phone broadcasts.

2. The method of claim 1, further comprising: subjecting the individual to security detection upon entrance into the interior cabin region.

3. The method of claim 1, wherein monitoring the environment of the scene includes obtaining audio and video recordings.

4. The method of claim 3, wherein at least some of the recordings are obtained from both interior and exterior cameras on the vehicle.

5. The method of claim 1, wherein interacting with people includes providing two-way communication between the interior cabin region and one or more law enforcement personnel located outside the vehicle.

6. The method of claim 1, wherein interacting with people includes providing messages and/or announcements to people around the vehicle.

7. The method of claim 1, further comprising sharing incident details to an operator of the vehicle prior to the vehicle arriving at the scene, with the incident details including information on the location of the scene and individuals at the scene.

8. A method of operating a conflict de-escalation system employing a vehicle having at least one door leading to an interior cabin region comprising:
   deploying the vehicle to a scene in dealing with an incident involving a mentally challenged, drug controlled, handicapped, incapacitated and/or unpredictable individual;
   directing the individual into the interior cabin region;
   monitoring an environment of the scene to develop incident related information, wherein monitoring the environment of the scene includes obtaining audio and video recordings, and wherein at least some of the recordings are obtained utilizing a drone provided on the vehicle; and
   interacting with people by providing the incident related information to others outside the vehicle through the conflict de-escalation system.

9. The method of claim 8, wherein interacting with people includes providing public awareness broadcasts originating from within the vehicle.

10. The method of claim 9, wherein the public awareness broadcasts include one or more of internet, television, radio and cell phone broadcasts.

11. A method of operating a conflict de-escalation system employing a vehicle having at least one door leading to an interior cabin region comprising:
    deploying the vehicle to a scene in dealing with an incident involving a mentally challenged, drug controlled, handicapped, incapacitated and/or unpredictable individual;
    directing the individual into the interior cabin region;
    monitoring an environment of the scene to develop incident related information; and
    interacting with people by providing the incident related information to others outside the vehicle through the conflict de-escalation system, including using a public portal accessible through a computer or cellphone app in interacting with people outside the vehicle.

12. The method of claim 11, further comprising using a law enforcement portal accessible through a computer or cellphone app in interacting with law enforcement personnel.

13. The method of claim 12, further comprising providing the law enforcement portal with certain information not available on the public portal.

14. A method of interacting with people about an incident involving a mentally challenged, drug controlled, handicapped, incapacitated and/or unpredictable individual using a conflict de-escalation system including a vehicle having at least one door leading to an interior cabin region into which the individual is directed comprising:
    monitoring an environment of the scene to develop incident related information;
    uploading the incident related information to a portal of the conflict de-escalation system, wherein the portal includes separate public and law enforcement portals; and
    interacting with the people about the incident by allowing the people to access the portal through a computer or cellphone app.

15. The method of claim 14, wherein monitoring the environment of the scene includes obtaining audio and video recordings.

16. The method of claim 15, wherein at least some of the recordings are obtained from both interior and exterior cameras on the vehicle.

17. The method of claim 15, wherein at least some of the recordings are obtained utilizing a drone provided on the vehicle.

18. The method of claim 14, further comprising providing the law enforcement portal with certain information not available on the public portal.

19. The method of claim 14, further comprising sharing incident details to an operator of the vehicle prior to the vehicle arriving at the scene, with the incident details including information on the location of the scene and individuals at the scene.

\* \* \* \* \*